United States Patent [19]

Apffel

[11] Patent Number: 4,675,035
[45] Date of Patent: Jun. 23, 1987

[54] CARBON DIOXIDE ABSORPTION METHANOL PROCESS

[76] Inventor: Fred P. Apffel, 14607 Quail Creek Ct., Houston, Tex. 77070

[21] Appl. No.: 832,747

[22] Filed: Feb. 24, 1986

[51] Int. Cl.⁴ .............................................. F25J 3/00
[52] U.S. Cl. ........................................ 62/17; 62/20; 62/28; 55/68
[58] Field of Search .................... 62/17, 20, 28; 55/68

[56] References Cited

U.S. PATENT DOCUMENTS

| | | | |
|---|---|---|---|
| 3,453,835 | 7/1969 | Hochgesand | 62/17 |
| 3,498,067 | 3/1970 | Ranke | 62/20 |
| 3,595,782 | 7/1971 | Bucklin et al. | 208/340 |
| 3,640,052 | 2/1972 | Konoki et al. | 55/19 |
| 3,683,634 | 8/1972 | Streich | 62/17 |
| 3,899,212 | 8/1975 | Kruis et al. | 62/17 |
| 3,977,203 | 8/1976 | Hinton et al. | 62/17 |
| 3,983,711 | 10/1976 | Solomon | 62/28 |
| 4,097,250 | 6/1978 | Pagini et al. | 55/48 |
| 4,115,086 | 9/1978 | Jordan et al. | 62/28 |
| 4,149,864 | 4/1979 | Eakman et al. | 62/11 |
| 4,152,129 | 5/1979 | Trentham et al. | 62/18 |
| 4,185,978 | 1/1980 | McGalliard et al. | 62/28 |
| 4,252,548 | 2/1981 | Breiter et al. | 62/17 |
| 4,293,322 | 10/1981 | Ryan et al. | 62/17 |
| 4,311,495 | 1/1982 | Strying | 62/17 |
| 4,318,723 | 3/1982 | Holmes et al. | 62/20 |
| 4,336,044 | 6/1982 | Barker et al. | 62/17 |
| 4,350,511 | 9/1982 | Holmes et al. | 62/17 |
| 4,383,841 | 5/1983 | Ryan et al. | 62/17 |
| 4,383,842 | 5/1983 | O'Brien | 62/20 |
| 4,428,759 | 1/1984 | Ryan et al. | 62/20 |
| 4,451,274 | 5/1984 | O'Brien | 62/17 |
| 4,462,814 | 7/1984 | Holmes et al. | 62/20 |
| 4,475,347 | 10/1984 | Hegarty et al. | 62/17 |
| 4,488,890 | 12/1984 | Foerg et al. | 62/20 |
| 4,563,202 | 1/1986 | Yao et al. | 62/20 |

*Primary Examiner*—Ronald C. Capossela
*Attorney, Agent, or Firm*—David M. Ostfeld

[57] ABSTRACT

A process is disclosed for the separation of hydrocarbon feed gas mixture containing methane and carbon dioxide, as well as other components such as ethane propane-and-heavier hydrocarbon, hydrogen sulfide, nitrogen, or other lighter inert gases, into various components. The steps of separation include distillation and absorption. These separations operate at temperatures and pressures such that the freezing or formation of solid carbon dioxide will not occur. The process utilizes four distillation units and one absorption unit.

34 Claims, 2 Drawing Figures

CARBON DIOXIDE ABSORPTION METHANOL PROCESS

TECHNICAL FIELD

The invention relates generally to the removal of carbon dioxide from a mixed hydrocarbon stream. More specifically, it relates to the absorption of carbon dioxide with methanol for such removal.

BACKGROUND ART

Numerous secondary oil recovery projects use carbon dioxide as a miscible injectant to recover additional oil from existing oil reservoirs. Carbon dioxide has the ability to reduce the surface tension of oil adhering to shale or rocks, causing it to flow out of the oil well. As the oil is produced from the carbon dioxide injection, the related gas produced will increase in volume and carbon dioxide concentration. The total gas volume will increase by a factor of five to seven. The hydrocarbon gas volume will increase by a factor of two. The carbon dioxide concentration will increase from 5 to 90 percent by volume over the nine to ten year life of the project. The composition of the hydrocarbons will vary little.

This carbon dioxide must be removed before the hydrocarbons can be utilized as a product. The recovered carbon dioxide is reinjected into the walls. A number of process methods have been developed and are being tried for this purpose. They include the conventional amine absorption systems, seloxol absorption and many others. These conventional process schemes have proven to be very expensive and energy inefficient when compared to recently developed cryogenic distillative process methods such as the process taught by the U.S. Pat. No. 4,462,814, issued July 31, 1984, to Arthur S. Holmes and James M. Ryan, entitled "Distillative Separation of Gas Mixtures Containing Methane, Carbon Dioxide and Other Components", known in the industry as the Ryan/Holmes process. This process teaches a method of separating the hydrocarbons from the carbon dioxide and a method of preventing azeotrope formation of carbon dioxide and ethane during the distillation separation process.

The distillation process schemes utilized in attempting to separate methane from the carbon dioxide and other hydrocarbons must deal with the potential formation of carbon dioxide solids. Ryan/Holmes solves this problem by introducing an agent to prevent the formation of solid carbon dioxide. A second problem that distillation process methods must handle is the separation of ethane from carbon dioxide due to the formation of the carbon dioxide-ethane azeotrope. This azeotrope formation limits the degree to which the carbon dioxide may be separated from the ethane. The Ryan/Holmes process solves this problem by the further introduction of the aforementioned agent. This agent is a propane-and-heavier mixture of hydrocarbons or some other hydrocarbon miscible non-polar liquid. This agent serves to maintain the relative volatility of carbon dioxide to ethane above one, and the azeotrope is not formed.

For further illustrations of carbon dioxide removal, see U.S. Pat. No. 4,475,347, issued Oct. 9, 1984, to Hegarty et al., entitled "Process for Separating Carbon Dioxide and Sulphur-Containing Gases from a Synthetic Fuel Production Process Off-Gas"; U.S. Pat. No. 3,453,835, issued July 8, 1969, to Hochgesand, entitled "Absorption of Carbon Dioxide Employing Separately Cooled Absorbent Streams"; U.S. Pat. No. 3,977,203, issued Aug. 31, 1976, to Hinton et al., entitled "Purfication of Natural Gas by Liquid/Liquid Extraction with a Polar Solvent"; U.S. Pat. No. 4,252,548, issued Feb. 24, 1981, to Breiter et al., entitled "Carbon Dioxide Removal from Methane-Containing Gases"; U.S. Pat. No. 4,293,322, issued Oct. 6, 1981, to Ryan et al., entitled "Distillative Separation of Carbon Dioxide from Hydrogen Sulfide"; U.S. Pat. No. 4,318,723, issued Mar. 9, 1982, to Holmes et al., entitled "Cryogenic Distillative Separation of Acid Gases from Methane"; U.S. Pat. No. 4,350,511, issued Sept. 21, 1982, to Holmes et al., entitled "Distillative Separation of Carbon Dioxide from Light Hydrocarbons"; U.S. Pat. No. 4,383,841, issued May 17, 1983, to Ryan et al., entitled "Distillative Separation of Carbon Dioxide from Hydrogen Sulfide"; U.S. Pat. No. 4,383,842, issued May 17, 1983, to O'Brien, entitled "Distillative Separation of Methane and Carbon Dioxide"; U.S. Pat. No. 4,462,814, issued July 31, 1984, to Holmes et al., entitled "Distillative Separation of Gas Mixtures Containing Methane, Carbon Dioxide and Other Components"; U.S. Pat. No. 3,595,782, issued July 27, 1971, to Bucklin et al., entitled "Method for Separating Carbon Dioxide from Hydrocarbons"; U.S. Pat. No. 3,640,052, issued Feb. 8, 1972, to Konoki et al., entitled "Process for Removing Carbon Dioxide in a Combined System for Producing Ammonia and Urea"; U.S. Pat. No. 3,683,634, issued Aug. 15, 1972, to Streich, entitled "Fractionation with Subsequent Recombination if Feed in Double Column Rectifier"; U.S. Pat. No. 3,899,212, issued Aug. 12, 1975, to Kruis et al., entitled "Extraction of Odorizing Sulfur Compounds from Natural Gas and Reodorization Therewith"; U.S. Pat. No. 3,983,711, issued Oct. 5, 1976, to Solomon, entitled "Plural Stage Distillation of a Natural Gas Stream"; U.S. Pat. No. 4,097,250, issued June 27, 1978, to Pagani et al., entitled "Method for the Purification of Natural Gas Having a High Contents of Acidic Acid"; U.S. Pat. No. 4,115,086, issued Sept. 19, 1978, to Jordan et al., entitled "Recovery of Light Hydrocarbons from Refinery Gas"; U.S. Pat. No. 4,149,864, issued Apr. 16, 1979, to Eakman et al., entitled "Separation of Carbon Dioxide and Other Acid Gas Components from Hydrocarbon Feed"; U.S. Pat. No. 4,152,129, issued May 1, 1979, to Trentham et al., entitled "Method for Separating Carbon Dioxide from Methane"; U.S. Pat. No. 4,185,978, issued Jan. 29, 1980, to McGallard et al., entitled "Method for Cryogenic Separation of carbon dioxide form Hydrocarbons"; and U.S. Pat. No. 4,311,495, issued Jan. 19, 1982, to Strying, entitled "Separating Carbon Dioxide and ethane by Liquid-Liquid Extraction."

DISCLOSURE OF THE INVENTION

The distillation and absorption process method disclosed avoids the potential formation of carbon dioxide solids by first separating a mixture of methane, lighter components, ethane and carbon dioxide from propane-and-heavier hydrocarbons in a first column. The degree of efficiency of separating the carbon dioxide and ethane between the top and bottom product is not critical. Consequently, carbon dioxide and ethane are found in both top and bottom products. The temperature and pressure required for this separation is such that no solid formation of carbon dioxide will take place. Thereafter, the overhead gas product is mixed with "lean" methanol, obtained from the bottom of a chimney tray of a downstream Methanol Absorber. The carbon dioxide and ethane mixture is absorbed or dissolved into the methanol mixture and refrigerated. Absorption of the remaining carbon dioxide and ethane gas is then accomplished in the Methanol Absorber.

The heavy bottoms from the tower containing some carbon dioxide and ethane are separated from the propane and heavier hydrocarbons in a second column. This carbon dioxide and ethane, together with the "rich" methanol mixture, are fed to a third column, together with more lean methanol. The presence of the polar component methanol serves both to invert and to increase the relative volatility of carbon dioxide to ethane. This allows the ethane to be distilled or stripped from the carbon dioxide, ethane, methanol mixture. The carbon dioxide is subsequently separated from the methanol in a fourth column. The methanol from this column becomes the "lean" methanol.

BRIEF DESCRIPTION OF DRAWINGS

For a further understanding of the nature and objects of the present invention, reference is made to the following drawings in which like parts are given like numerals and wherein:

FIGS. IA and IB are a schematic flow diagram illustrating the distillative separation of carbon dioxide, methane and ethane from each other and from propane-and-heavier hydrocarbons, of the preferred embodiment of the present invention. Designations "R" and "H" illustrate the locations where propane or Freon TM or other suitable refrigeration "R" and low-level gas compression or other heat "H" is provided by sources not shown.

PREFERRED MODE FOR CARRYING OUT THE INVENTION

Figure 1A:
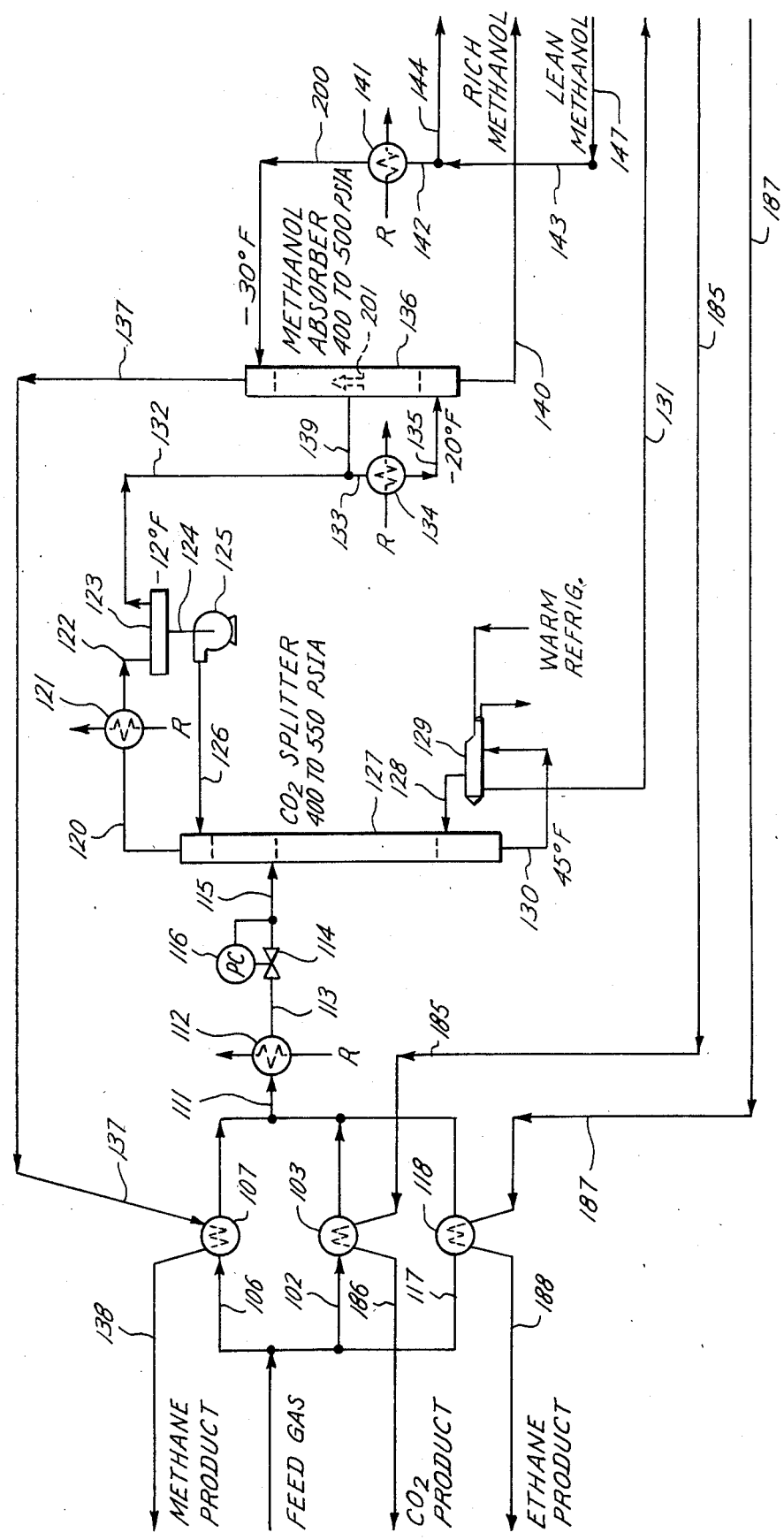
Figure 1B:
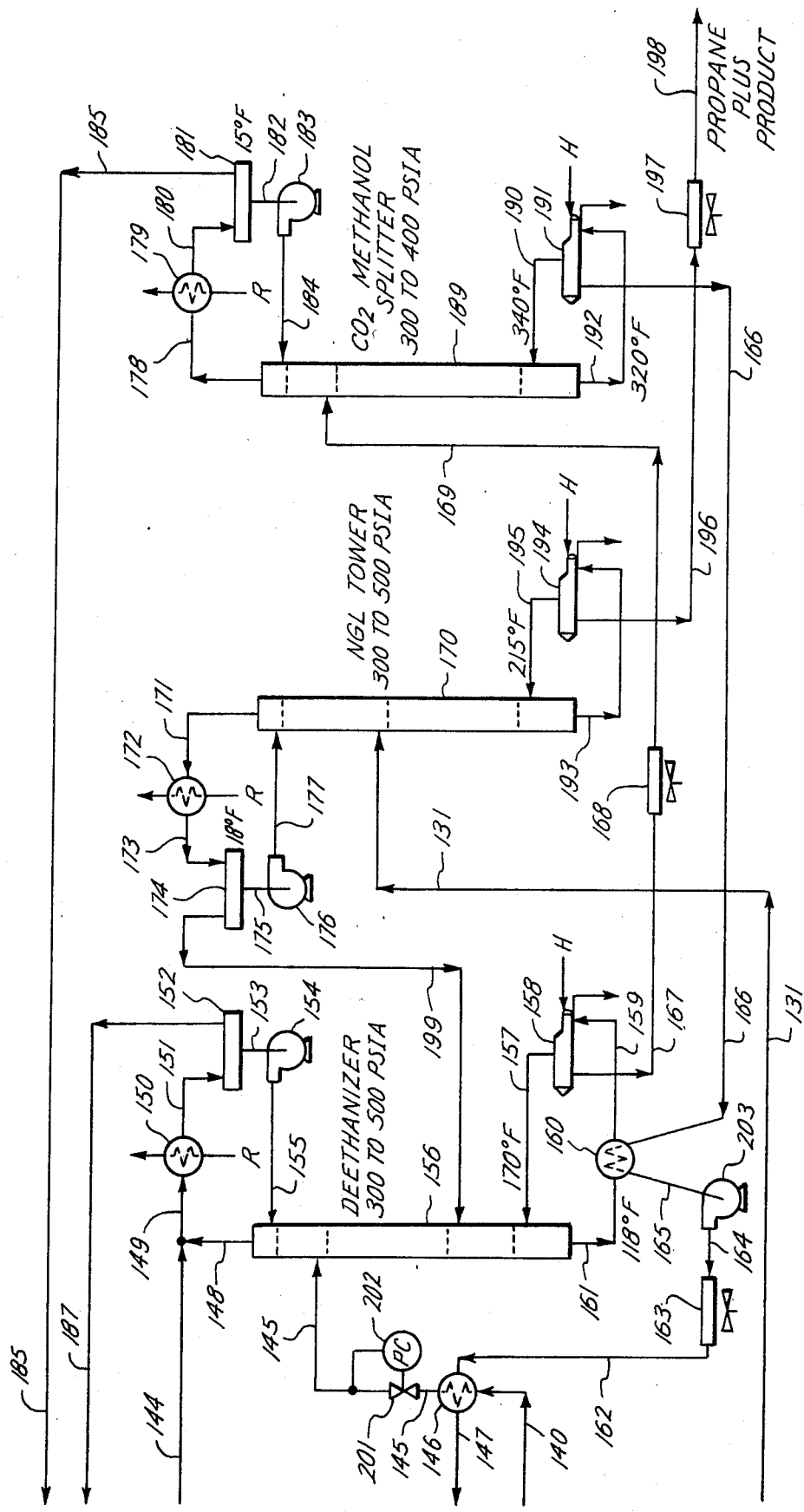

Referring to FIG. 1A, there is shown the feed gas stream 101 which is split into three streams 102, 106 and 117. The feed gas in streams 102, 106, 117 cross-exchange with product methane in stream 137, for stream 106, product ethane in stream 187, for stream 117, and product carbon dioxide in stream 185 for stream 102. The split is distributed on the basis of the cryogenic energy that can be recovered from each of these outgoing streams 137, 187, 185. The exchange of energy is accomplished in Feed Gas to Methane Gas Exchanger 118 for streams 117, 187, Feed Gas to Ethane Gas Exchanger 107 for streams 106, 137, and Feed Gas to carbon dioxide Exchanger 103 for streams 102, 185. The cooled feed gas from streams 102, 106, 117 is recombined in stream 111 and chilled to a temperature of 50° to −30° F. with propane or Freon TM of other suitable refrigeration (not shown in detail) in a Chiller 112. The chilled feed stream 113 is reduced in pressure to a level of 550 to 400 psia by a pressure control valve 114 and fed to a $CO_2$ Splitter 127 via valve effluent stream 115. The pressure is set and controlled by a Pressure Controller 116. The overhead gas from the $CO_2$ Splitter 127 exits in stream 120 and is chilled to a temperature of 0° to −30° F. by a $CO_2$ Splitter Reflux Condenser 121 with propane or Freon TM refrigeration (not shown in detail). The effluent stream 122 from the Splitter Reflux Condensor 121 flows to a Reflux Accumulator 123. Part of the gas in stream 122 is condensed, and this liquid is separated from the gas in the Reflux Accumulator 123, the liquid leaving the Reflux Accumulator 123 via stream 124. The liquid in stream 124 is pumped by a Reflux Pump 125 to the $CO_2$ Splitter 127 via stream 126. The uncondensed carbon dioxide, ethane, and methane-and-lighter gases exit the Reflux Accumulator 123 via stream 132.

The bottom stream 130 from $CO_2$ Splitter 127 is heated using heat from the refrigerant fluid (not shown in detail) in a $CO_2$/Splitter Reboiler 129. The purpose is to recover the colder refrigerant energy from the process fluid in stream 130 which is at a temperature of 25° to 65° F. The refrigerant fluid is cross-exchanged in the $CO_2$/Splitter Reboiler 129 with the process stream 130 from the $CO_2$ Splitter 127. The heat partially vaporizes this fluid. The vapor is returned to the $CO_2$ Splitter 127 via stream 128. The liquid, free of methane-and-lighter components and containing some carbon dioxide, ethane and all of the propane-and-heavier hydrocarbons, exits the $CO_2$/Splitter Reboiler 129 in stream 131 which is fed to an NGL Tower 170.

Stream 132 is combined with liquid in stream 139 which is from a chimney tray 201 of a Methanol Absorber 136 to form stream 133 which feeds to the Absorber Feed Chiller 134. Stream 133 is chilled in the Absorber Feed Chiller 134 to temperature of 10° to −35° F. Part of the carbon dioxide and ethane are condensed and dissolved in the methanol and exits the Absorber Feed Chiller 134 in stream 135. Stream 135 is fed to the bottom of the Methanol Absorber 136. The vapor and liquid are separated in the bottom of the Methanol Absorber 136. The uncondensed methane, carbon dioxide and ethane gas flow up the absorber countercurrent to the downcoming "lean" methanol, which absorbs the carbon dioxide, ethane and not the methane. In this context, "lean" methanol means methanol that has been essentially stripped free of ethane, carbon dioxide and other hydrocarbons. The "lean" methanol feeds the top of the Methanol Absorber 136 in stream 200 at temperatures of −35° to 10° F. The methanol rate is adjusted on the basis of absorbing the carbon dioxide and rejecting the methane-and-lighter components. This is approximately between two and three to one molal ratio of methanol to carbon dioxide. The Methanol Absorber 136 is operated at pressures of 400 to 500 psia. The methane-and-lighter lighter component such as nitrogen exit the top of the Methanol Absorber 136 in stream 137 at temperatures of −10° to 25° F. above the temperature of the "lean" methanol in stream 200. Stream 137 cross-exchanges with the feed gas in Exchanger 107 and exits to the pipeline in stream 138 at temperatures of 80° to 110° F.

The "rich" methanol, which is the methanol containing the absorbed carbon dioxide, ethane and other heavier hydrocarbons, leaves the bottom of the Methanol Absorber 136 in stream 140 at temperatures of 10° to −40° F. This "rich" methanol stream 140 is cross-exchanged in a Lean-Rich Methanol Cross-Exchanger 146 with the "lean" methanol from stream 162 to heat the "rich" methanol to a temperature of 80° F. which exits in stream 147 and correspondingly reduces the "lean" methanol to a temperature level of −10° to 20° F., recovering the cryogenic refrigerant energy. The "rich" methanol in stream 145 is reduced in pressure to 300 to 500 psia by a pressure control valve 201, which is controlled by a Pressure Controller 202. The "rich" methanol stream 145 subsequently feeds a Deethanizer 156. This feed stream 145 is fed near the top of the Deethanizer 145 on the top third or fourth tray.

Stream 131 is fed to the NGL Tower 170 to separate the carbon dioxide and ethane from the propane-and-heavier hydrocarbons. The overhead gas from NLG Tower 170 in stream 171 is fed to an NGL Tower Reflux Condenser 172 where the stream is refrigerated with propane or Freon TM (not shown in detail), to temperatures of 0° to 50° F. The partially condensed fluid from the Reflux Condenser 172 is fed to an NGL Reflux Accumulator 174 via stream 173. The vapor is separated from the liquid in NGL Reflux Accumulator 174. The liquid reflux flows from the Reflux Accumulator 174 via stream 175 to an NGL Reflux Pump 176 and subsequently pumped to the NGL Tower 170 via stream 177.

The vapor from the Reflux Accumulator 174 exits in stream 199 to the Deethanizer 156. This vapor acts as a stipping medium and is fed near the lower part of the Deethanizer 156.

The liquid bottoms exit the NGL Tower in stream 193 and flows to an NGL Tower Reboiler 194. Heat is provided to the NGL Tower Reboiler 194 using steam (not shown in detail) or some other suitable heat medium. The liquid in stream 193 is heated in the NGL Tower Reboiler 194 to a temperature of 200° to 250° F. where part of the liquid is vaporized. The vapor returns to the NGL Tower via stream 195. The unvaporized liquid exits in stream 196 and is subsequently cooled by the Air Cooler 197 to a temperature of 120° F. or less. The cooled liquid from the Air Cooler 197 exits the system as the propane-and-heavier product via stream 198.

Those skilled in the art, will recognize that there are other suitable means of cooling stream 197, such as a water cooled heat exchanger, as well as many ways and alternate refrigerants to use for cooling and heating the other process streams.

The Deethanizer 156 separates the ethane from the carbon dioxide and the methanol. The overhead from Deethanizer 156 exits in stream 148 and is combined with a split stream 144 of the recycled "lean" methanol from stream 147 to form stream 149. The purpose of this combination is to preferentially reabsorb any carbon dioxide that may be displaced to the top of the Deethanizer 156 during the distillation. The mixture in stream 149 is chilled to temperatures of 0° to 30° F. in a Deethanizer Reflux Condenser 150 using the propane or Freon TM refrigeration (not shown in detail). The mixture exits the Deethanizer Reflux Condenser 150 and flows to a Reflux Accumulator 152 via stream 151. The liquid is separated from the vapor in the Reflux Accumulator 152 and then flows to a Reflux Pump 154 via stream 153, and is pumped to the Deethanizer 156 via stream 155. Ethane exits the Reflux Accumulator 152 as a gas in stream 187 at temperatures of 0° to 35° F., to cross-exchange with the incoming feed gas 117 in exchanger 118. The ethane exits the plant in stream 188 at Temperatures 80° to 110° F.

The Deethanizer Tower 156 bottoms feed a Deethanizer Tower Reboiler 158 via stream 161 at 90° to 120° F. The bottoms in stream 161 are heated to a temperature of 130° to 190° F. by a cross-exchange with hot "lean" methanol from a $CO_2$/Methanol Splitter 189 flowing in stream 166. This heat or energy exchange is made by a Deethanizer Bottoms/Methanol Exchanger 160. The purpose is to recover heat energy and cool the "lean" methanol.

The Deethanizer 156 bottoms exit the Deethanizer Bottoms/Methanol Exchanger 160 in stream 159 to a final or Deethanizer Trim Reboiler 158 where the Deethanizer 156 bottoms fluid is further heated to temperatures of 150° to 210° F. using steam (not shown in detail) or some other suitable heat source. The vapor generated by the Trim Reboiler is returned to the Deethanizer 156 via stream 157. The liquid carbon dioxide and methanol exit the Deethanizer Trim Reboiler 158 in stream 167 where it is cooled to 120° F. or less by the Air Cooler 168. The cooled liquids exits the Air Cooler 168 via stream 169. As set out above, other kinds of media or exchanges, such as in this case a water cooled exchanger could be used without departing from the invention.

The cooled liquid in stream 169 is fed to the $CO_2$/Methanol Splitter 189. The carbon dioxide is separated from the methanol in the $CO_2$/Methanol Splitter 189. The overhead gas exits from the $CO_2$/Methanol Splitter in stream 178 and is chilled by the Freon TM or propane refrigerant (not shown in detail) in a $CO_2$/Methanol Splitter Condenser 179 to a temperature of 0° to 40° F. The chilled stream exits the $CO_2$/Methanol Splitter Condensor 179 via stream 180 and flows to the $CO_2$/Methanol Reflux Accumulator 181. The vapor and liquid are separated in $CO_2$/Methanol Reflux Accumulator 181. The carbon dioxide vapor or gas exits the accumulator via stream 185 to flow to Feed Gas to carbon dioxide Exchanger 103. The carbon dioxide in stream 185 is heated to 80° to 100° F. by a cross-exchange of energy with the feed gas 102. The heated carbon dioxide exits the plant in stream 186.

The liquid reflux flows from the Reflux Accumulator 181 to a $CO_2$/Methanol Reflux Pump 183 via stream 182 and is pumped to the $CO_2$/Methanol Splitter 189 via stream 184.

The $CO_2$/Methanol Splitter 189 bottoms stream 192 is heated from 300° to 350° F. to a temperature of 320° to 380° F. by a $CO_2$/Methanol Splitter Reboiler 191. Steam or some other suitable means of heat is required for the $CO_2$/Methanol Splitter Reboiler 191. Part of the fluid is vaporized and returned to the $CO_2$/Methanol Splitter 189 via stream 190. The hot "lean" methanol liquid exits the $CO_2$/Methanol Splitter Reboiler 191 in stream 166. This hot "lean" methanol in stream 166 is cross-exchanged in the Deethanizer Bottoms/Methanol Exchanger 160 to cool the "lean" methanol and reduce the heat energy load. The cooled "lean" methanol exits the Deethanizer Bottoms/Methanol Exchanger 160 via stream 165 to the Lean Methanol Pump 203, where the pressure is elevated to a level of 500 to 650 psia in stream 164. The "lean" methanol is further cooled to 120° F. by the Air Cooler 163 and subsequently cross-exchanged with the "rich" methanol to recover the refrigerated energy in the Lean-Rich Methanol Exchanger 146.

The cooled "lean" methanol exits the Lean-Rich Methanol Exchanger 146 via stream 147. The "lean" methanol in stream 147 is split into two streams. One stream 142 is further refrigerated to a temperature level of 0° to −35° F. by a Methanol Chiller 141 using an external refrigeration source such as Freon TM or propane (not shown in detail). The chilled "lean" methanol flows from the Methanol Chiller 141 via stream 200 to the top of the Methanol Absorber 136. The other stream 144 from stream 147 is combined with the overhead gas in stream 148 and flows to the Deethanizer Reflux Condenser 152. This completes the recycle of the methanol system.

In operation, the methane, lighter components, together with most of the carbon dioxide and some ethane, are separated from the propane-and-heavier hydrocarbons in $CO_2$ Splitter 127. Approximately fifteen to twenty percent of the incoming carbon dioxide and twenty-five to thirty-five percent of the incoming ethane is distributed to the bottoms product. The efficiency of the separation with respect to carbon dioxide and ethane distribution between the top and bottom products is not critical. An effective separation of the propane-and-heavier hydrocarbons from the methane-and-lighter components is important. The heavier hydrocarbons are difficult to separate from methanol. In fact, the pentane-and-heavier hydrocarbons would form an azeotrope with methanol. Fortunately this separation is very easy to achieve. Due to this method of separation, the operating temperatures and pressure of −40° to 0° F. and 400 to 550 psia in the CO₂ Splitter 127 are such that solidification of carbon dioxide will not occur.

The overhead gas product from this distillation containing methane, lighter components, carbon dioxide, and ethane is mixed with liquid withdrawn at the bottom chimney tray of Methanol Absorber 136. The mixture is refrigerated to a temperature of −40° to 0° F. This partially condenses some of the carbon dioxide and ethane both of which are absorbed or dissolved into the "lean" methanol. The refrigeration removes the heat of solution or absorption and effectively reduces the "lean" methanol rate. The mixture is fed to the bottom of the Methanol Absorber 136 where the gas and liquid separate. The gas flows upward, countercurrent to the downcoming "lean" methanol fed at the top of the Methanol Absorber 136. This "lean" methanol has been chilled to a temperature of 0° to −40° F. The "lean" methanol rate is based on a molal ratio of carbon dioxide to methanol of between two and three to one. The carbon dioxide and ethane both are more soluble in methanol than methane or the lighter components. Consequently, those components are dissolved or absorbed in the "lean" methanol. The separated liquid leaves the bottom of the Methanol Absorber 136 as a liquid at temperatures of 10° to 20° degrees above the inlet "lean" methanol. Hydrogen Sulfide is also very soluble in methanol and if any is present, it will be dissolved in the methanol. The "rich" methanol is cross-exchanged with the "lean" methanol to recover the cryogenic energy and warm the "rich" methanol.

The bottoms from the CO₂ Splitter 127 is fed to the NGL Tower 170. The ethane and carbon dioxide are distilled in the NGL Tower 170 as a top gas product at temperature of 0° to 30° F. If hydrogen sulfide is present it will become a part of the ethane and carbon dioxide product. The NGL Tower 170 is operated at pressures of 300 to 500 psia. The bottom from the NGL Tower 170 is cooled to 120° F. to exit the system as a propane-and-heavier hydrocarbon product liquid.

The warmed bottoms "rich" methanol from the Methanol Absorber 136 are fed on the top third or fourth tray of the Deethanizer 156. The overhead gas product from the NGL Tower 170 is fed at the bottom of the Deethanizer 156. A small amount, approximately ten to twenty percent of the total "lean" methanol, is fed at the top of the Deethanizer 156 in stream 144. As discussed above, the presence of the methanol, a polar molecular, serves to invert the relative volatility ratio of carbon dioxide and ethane causing the ethane to become the lighter component. On this basis, the ethane is distilled or stripped from the carbon dioxide and methanol as the top product. This presence of the methanol also serves to increase the relative volatility ratio of ethane to carbon dioxide, making the separation of ethane from the carbon dioxide methanol mixture much less difficult. This ethane may be recombined with the methane product or maintained separately. The deethanizer 156 is operated at pressures of 300 to 500 psia with top temperatures of 10° to 35° F., and corresponding bottom temperatures 100° to 200° F.

The bottoms from the Deethanizer 156, carbon dioxide and methanol, are fed to the CO₂/Methanol Splitter 189. The carbon dioxide is distilled as the overhead product and may be recovered as a liquid or vapor. If hydrogen sulfide is present, it will become a part of the carbon dioxide product. The methanol bottoms product stripped of carbon dioxide and other hydrocarbons becomes the "lean" methanol. It is cooled to 120° F. and recycled to the system. The CO₂/Methanol Splitter is operated at pressures of 300 to 400 psia with top temperatures of −15° to 25° F. and corresponding bottoms temperatures 300° to 400° F.

Typical operating conditions, product distributions, and flow rates are illustrated in Table I.

TABLE I

| COMPONENT | STREAM | | | | | | | | | | | | | |
|---|---|---|---|---|---|---|---|---|---|---|---|---|---|---|
| | 101 | 132 | 131 | 137 | 138 | 142 | 140 | 199 | 196 | 144 | 187 | 169 | 185 | 162 |
| N2 | 98.00 | 97.92 | 0.08 | 97.92 | 97.92 | 0.00 | 0.00 | 0.08 | 0.00 | 0.00 | 0.00 | 0.00 | 0.00 | 0.00 |
| CH4 | 514.00 | 513.80 | 0.20 | 513.00 | 513.00 | 0.00 | 0.80 | 0.20 | 0.00 | 0.00 | 1.00 | 0.00 | 0.00 | 0.00 |
| CO2 | 1000.00 | 815.96 | 184.04 | 10.77 | 10.77 | 28.58 | 833.77 | 183.46 | 0.58 | 6.00 | 13.04 | 1010.19 | 975.61 | 34.58 |
| H2S | 3.60 | 1.69 | 1.91 | 0.00 | 0.00 | 0.00 | 1.69 | 1.56 | 0.35 | 0.00 | 0.04 | 3.21 | 3.21 | 0.00 |
| C2H6 | 158.00 | 111.98 | 46.02 | 51.84 | 51.84 | 0.00 | 60.14 | 40.04 | 5.98 | 0.00 | 80.24 | 19.94 | 19.94 | 0.00 |
| C3H8 | 132.00 | 12.62 | 119.38 | 0.00 | 0.00 | 0.00 | 12.62 | 2.78 | 116.60 | 0.00 | 0.00 | 15.40 | 15.40 | 0.00 |
| IC4H10 | 62.00 | 0.01 | 61.99 | 0.00 | 0.00 | 0.00 | 0.02 | 0.03 | 61.96 | 0.00 | 0.00 | 0.05 | 0.05 | 0.00 |
| IC5H12 | 26.00 | 0.00 | 26.00 | 0.00 | 0.00 | 0.00 | 0.00 | 0.00 | 26.00 | 0.00 | 0.00 | 0.00 | 0.00 | 0.00 |
| NC6H14 | 6.40 | 0.00 | 6.40 | 0.00 | 0.00 | 0.00 | 0.00 | 0.00 | 6.40 | 0.00 | 0.00 | 0.00 | 0.00 | 0.00 |
| MEOH | 0.00 | 0.00 | 0.00 | 0.09 | 0.09 | 2000.00 | 1999.91 | 0.00 | 0.00 | 400.00 | 0.19 | 2399.72 | 0.96 | 2398.76* |
| TOTAL | 2000.00 | 1553.98 | 446.02 | 673.62 | 673.62 | 1825.00 | 2908.95 | 228.15 | 217.87 | 406.00 | 94.51 | 3448.51 | 1015.17 | 2433.34 |
| TEMP-F | 115 | −12 | 68 | −29 | 100 | 77 | 7 | 19 | 215 | 77 | 25 | 115 | 15 | 120 |
| PRES-PSIA | 615 | 500 | 503 | 500 | 495 | 545 | 505 | 450 | 455 | 545 | 360 | 355 | 350 | 555 |

*METHANOL MAKE UP IS 1.24 MOL/HR

The above is computer calculated.

The advantage of the art disclosed by this process over the Ryan/Holmes separation system discussed in the "Background" is that no solid formation of carbon dioxide will take place in the distillation and absorption separation systems described herein because the minimum temperature required is −40° F. which is well above the freezing point of carbon dioxide. Further at this level of temperature and above, all of the materials of construction for the distillation and absorption system may be carbon steel which reduces the plant cost. Also, the methanol which is a polar molecule used to absorb the carbon dioxide, hydrogen sulfide, and ethane from the methane-and-lighter components serves to invert the relative volatility of carbon dioxide to ethane and maintain it well above one. Based on this fact, the methanol not only prevents the potential formation of the carbon dioxide-ethane azeotrope but permits the separation or distillation of the ethane from the carbon dioxide and methanol as the lighter component.

A comparison of capital cost and energy consumption may also be made with the Ryan/Holmes process, for which information is taken from the data in the Holmes, et al U.S. Pat. No. 4,462,814, issued July 31, 1984 and from information abstracted from the Proceedings of the Sixty-First Gas Processors Associates Meeting Papers, presented Mar. 5-17, 1982, "Comparison of Processes for Treating Gases with High $CO_2$ Content" by Clifton S. Goodin.

A simulation of the Ryan/Holmes process was performed and adjusted until it met the performance described in the "Goodin" paper. This was necessary to assure that the process method used for the Ryan/Holmes process simulation was accurate. After the method was established, the process simulation was repeated with feed gas illustrated in Table I. From this, the equipment was specified and priced. The methanol process, similarly simulated, equipment was also specified and priced.

The overall utility requirements are illustrated in Table II.

TABLE II

| UTILITIES | | |
|---|---|---|
| HORSEPOWER | APFFEL METHANOL BHP | RYAN/HOLMES BHP |
| Pumps | 51 | 124 |
| Air Coolers | 206 | 250 |
| Compressors | 4,226 | 5,570 |
| Total | 4,483 | 5,944 |
| | DUTY MBTU/HR | DUTY MBTU/HR |
| Steam | 31,027 | 32,235 |

Based on Table II information, the Ryan/Holmes process consumed thirty-two percent more mechanical equipment horsepower and approximately four percent more steam.

Despite the fact that five towers and related equipment are required for the present process versus the Ryan/Holmes system that only uses three units, the Ryan/Holmes process cost forty-seven percent more.

The major difference in cost is due to the fact that no stainless steel materials are required in the present process and the distillation and absorption towers are much smaller.

Because many varying and different embodiments may be made within the scope of the inventive concept herein taught including equivalent structures or materials or heat and cooling media and techniques hereafter thought of. For example, instead of methanol as the polar compound, other polar alcohols, such as ethanol, and acetone could be used. Because many modifications may be made in the embodiments herein detailed in accordance with the descriptive requirements of the law, it is be understood that the details herein are to be interpreted as illustrative and not in a limiting sense.

What is claimed is:

1. A process for removing carbon dioxide from a feed stream of natural gas, having at least methane, ethane and heavier hydrocarbon, comprising:

A. First, separating the feed stream in a first separator to form a first stream, having substantially all of the propane and heavier hydrocarbons and carbon dioxide and ethane, and a second stream, having methane, carbon dioxide and ethane;
   B. Mixing the second stream with a polar compound to form a third stream;
   C. Separating the vapor and liquid of the third stream in the bottom portion of an absorber;
   D. Absorbing carbon dioxide and ethane from the separated vapor of Step C in a lean portion of the polar compound in the absorber, the absorbed carbon dioxide and ethane forming a fourth stream;
   E. Separating the ethane from the polar compound and carbon dioxide in a separator;
   F. Separating the first stream in a third separator to separate the propane and heavier hydrocarbons from the carbon dioxide and ethane, which carbon dioxide and ethane forms a fifth stream; and
   G. Separating the polar compound/carbon dioxide effluent of the second separator in a fourth separator, to separate the carbon dioxide from the polar compound, the polar compound forming a sixth stream.

2. The process of claim 1, wherein prior to step A, there is included the step of recovering refrigeration energy by indirect heat exchanging product streams with the feed stream.

3. The process of claim 2, wherein the product streams include at least a methane stream and a carbon dioxide stream.

4. The process of claim 3, wherein the product streams further include an ethane stream.

5. The process of claim 1, wherein the polar compound is taken from the group consisting of polar alcohols and acetone.

6. The process of claim 5 wherein the polar compound in Step B is included in a mixture with other compounds from the second stream.

7. The process of claim 5, wherein the polar compound is methanol.

8. The process of claim 5, wherein the mixture of Step B is chilled to cause carbon dioxide and ethane which are present in the second stream to condense and dissolve in the polar compound.

9. The process of claim 1, wherein prior to Step A the feed stream is chilled to a temperature of 50° to −30° F. in a chiller.

10. The process of claim 9, wherein the pressure of the chilled feed stream is reduced to 550 to 400 psia and the first separator operates at a pressure at 550 to 400 psia and a temperature of −40° to 0° F.

11. The process of claim 1, wherein there is included in Step A the step of cooling the second stream to a temperature of 0° to −40° F.

12. The process of claim 1, wherein Step B includes the step of chilling the second stream to a temperature of 10° to −35° F.

13. The process of claim 1, wherein the lean polar compound of step D is fed to the absorber at a temperature of −35° to 10° F.

14. The process of claim 1, wherein in Step D the lean polar compound rate is adjusted on the basis of absorbing the carbon dioxide and rejecting the methane-and-lighter components.

15. The process of claim 14, wherein the molal ratio of the polar compound to carbon dioxide is between two and three to one polar compound to carbon dioxide.

16. The process of claim 14, wherein the absorber is operated at pressures of 400 to 500 psia.

17. The process of claim 1, wherein the lean polar compound is fed to the absorber in Step D at −10° to 20° F.

18. The process of claim 17, wherein the effluent gas from Step D includes substantially only methane-and-lighter components at temperatures of −10° F. to 25° F. above the temperature of the lean polar compound introduced to the absorber.

19. The process of claim 17, wherein the lean polar gas is indirectly heat exchanged with the fourth stream to reduce the temperature of the fourth stream to −10° to 20° F.

20. The process of claim 1, wherein the fourth stream is reduced in pressure to 300 to 375 psia before being introduced into the second separator.

21. The process of claim 1, wherein the second separator operates at a pressure of 300 to 500 psia.

22. The process of claim 1, wherein the fourth stream is introduced into the second separator near the top of the second separator.

23. The process of claim 1, wherein the fifth stream is fed to the lower part of the second separator.

24. The process of claim 23, wherein the fifth stream is refrigerated to a temperature of 0° to 50° F.

25. The process of claim 1, wherein the third separator operates at a pressure of 300 to 400 psia.

26. The process of claim 1, wherein the direct vapor effluent from the second separator is condensed and prior to being condensed is mixed with a lean portion of the polar compound.

27. The process of claim 1, wherein the bottom effluent at the second separator is indirectly heat exchanged with the sixth stream to recover heat energy from the sixth stream.

28. The process of claim 1, wherein the fourth separator operates at a pressure of 300 to 400 psi.

29. The process of claim 1, wherein the feed stream to the fourth separator is at a temperature at 120° F. or less.

30. The process of claim 1, wherein the sixth stream is the supply of substantially all of the lean polar compound.

31. The process of claim 1, wherein the lean polar compound is chilled to a temperature of 0° to −40° F. before entering the absorber.

32. The process of claim 1, wherein there is further included hydrogen sulfide in the feed stream, and the hydrogen sulfide is dissolved in the fourth stream, the fifth stream and the carbon dioxide effluent of the fourth separator.

33. A process for removing carbon dioxide from a feed stream of natural gas, having at least methane, ethane, and heavier hydrocarbons, comprising:
   A. Separating the feed stream into a Stream 1 including substantially all of the propane and heavier hydrocarbons components and into a Stream 2 including substantially all the methane and lighter gases, both Streams 1 and 2 having other components including ethane;
   B. Absorbing the other components from Stream 2 in a lean polar compound, the other components forming Stream 3;
   C. Separating the other components from Stream 1, the other components forming Stream 4;
   D. Separating the ethane from Streams 3 and 4, the remainder forming Stream 5; and
   E. Separating the polar compound from the rest of Stream 5.

34. Apparatus for the removal of carbon dioxide from a feed stream of natural gas, having at least methane, ethane and heavier hydrocarbons, comprising:
   First means for separating the feed stream into a Stream 1 having substantially all of the propane and heavier hydrocarbons and a Stream 2 having substantially all the methane and lighter gases, both of said Streams 1 and 2 having other components including ethane;
   Second means including a polar compound for absorbing said other components from said Stream 2 to form Stream 3;
   Third means for separating said other components of said Stream 1 to form Stream 4;
   Fourth means for separating ethane from said Streams 3 and 4, the remainder of said Streams 3 and 4 forming Stream 5;
   Fifth means for separating said polar compound from the rest of said Stream 5; and
   Sixth means for recycling said polar compound to said Second means.

* * * * *